US006895440B1

(12) United States Patent
Lui

(10) Patent No.: US 6,895,440 B1
(45) Date of Patent: May 17, 2005

(54) NETWORK COMPONENT PERFORMANCE TESTING

(75) Inventor: William Lui, Alameda, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/578,942

(22) Filed: May 25, 2000

(51) Int. Cl.$^7$ .............................................. G06F 15/16
(52) U.S. Cl. ...................... 709/231; 370/248; 370/232; 370/242
(58) Field of Search ................................ 709/231, 224, 709/238, 232, 225, 248; 370/232, 248, 242, 216, 231, 236, 409, 250

(56) References Cited

U.S. PATENT DOCUMENTS

| | | | | |
|---|---|---|---|---|
| 5,027,343 A | * | 6/1991 | Chan et al. .................. | 370/250 |
| 5,974,052 A | * | 10/1999 | Johnson et al. .............. | 370/467 |
| 6,038,219 A | * | 3/2000 | Mawhinney et al. ......... | 370/242 |
| 6,115,362 A | * | 9/2000 | Bosa et al. .................. | 370/248 |
| 6,147,998 A | * | 11/2000 | Kelley et al. ............. | 370/395.1 |
| 6,269,330 B1 | * | 7/2001 | Cidon et al. .................... | 714/43 |
| 6,278,708 B1 | * | 8/2001 | Von Hammerstein et al. .......................... | 370/389 |
| 6,304,546 B1 | * | 10/2001 | Natarajan et al. ........... | 370/216 |
| 6,483,811 B1 | * | 11/2002 | Jabbarnezhad .............. | 370/250 |
| 6,546,420 B1 | * | 4/2003 | Lemler et al. .............. | 709/224 |
| 6,584,074 B1 | * | 6/2003 | Vasamsetti et al. .......... | 370/254 |

OTHER PUBLICATIONS

S. Jafar Sadjadi, "CTE Announces World's First Frame Relay Data Communication Device with Compression, Encryption, and TI/EI features" Mar. 28, 1996, pp. 1–3.*

D. Harkins and D. Carrel, Network Working Group—Standards Track, "The Internet Key Exchange (IKE)," Nov. 1998, pp. 1–42, http://rfc.sunsite.dk/rfc/rfc2409.html.

R. Atkinson, Network Working Group—Standards Track, "IP Encapsulating Security Payload (ESP)," Aug. 1995, pp. 1–13, http://rfc.sunsite.dk/rfc/rfc1827.html.

R. Atkinson, Network Working Group—Standards Track, "IP Authentication Header," Aug. 1995, pp. 1–14, http://rfc.sunsite.dk/rfc/rfc1826.html.

R. Atkinson, Network Working Group—Standards Track, "Security Architecture For The Internet Protocol," Aug. 1995, pp. 1–23, http://rfc.sunsite.dk/rfc/rfc1825.html.

* cited by examiner

*Primary Examiner*—David Wiley
*Assistant Examiner*—Phuoc H. Nguyen
(74) *Attorney, Agent, or Firm*—Campbell Stephenson Ascolese LLP

(57) ABSTRACT

A method and system for testing. In one embodiment, the method includes but is not limited to coupling one or more modified frame relay sub-interface entities internal to at least one network router with one or more corresponding data link layer entities internal to at least one unit under test. In one embodiment, hardware and software are utilized to effect the foregoing described method. In one embodiment, a system includes but is not limited to one or more modified frame relay sub-interface entities internal to at least one network router coupled with one or more corresponding data link layer entities internal to at least one unit under test.

36 Claims, 16 Drawing Sheets

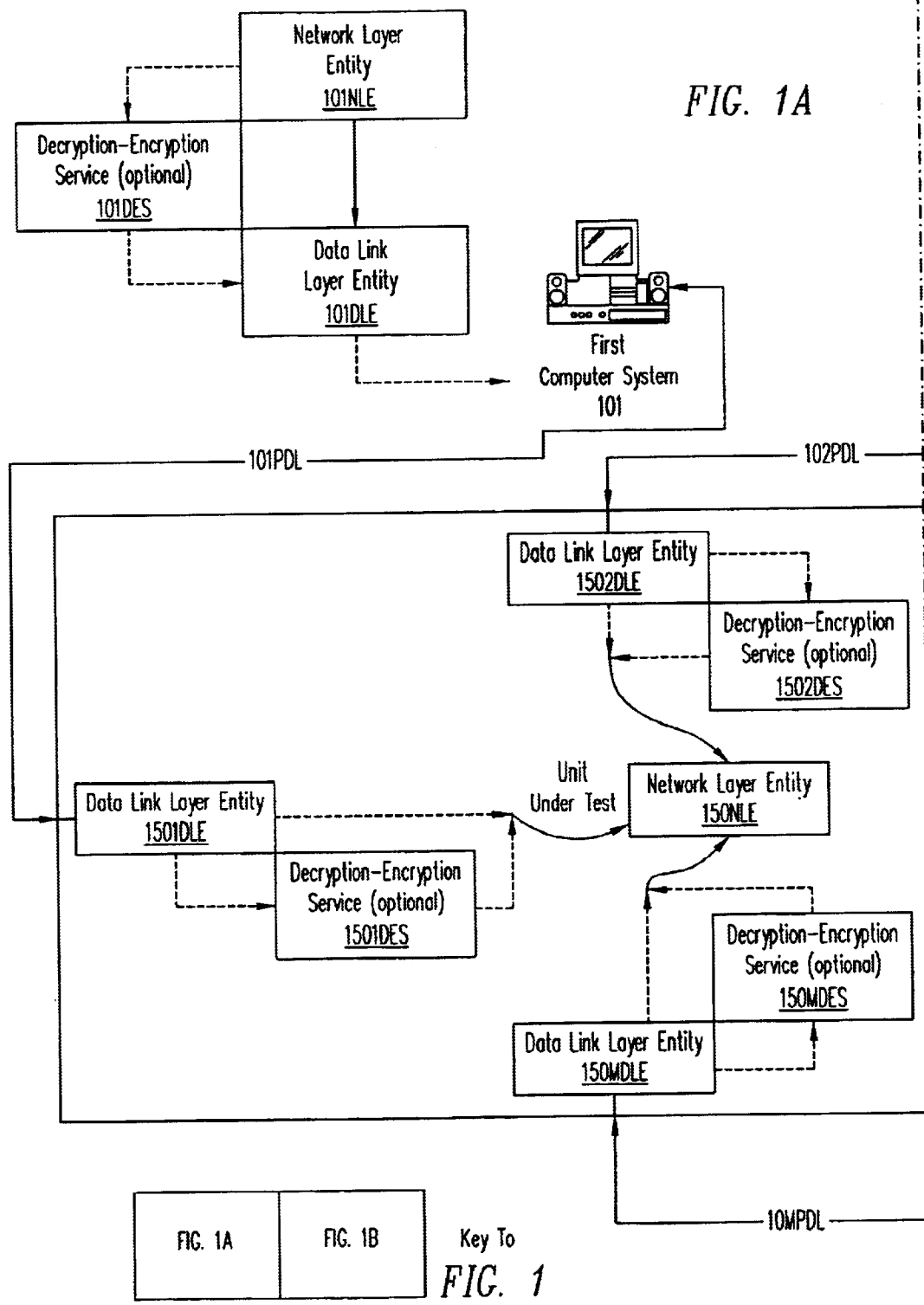

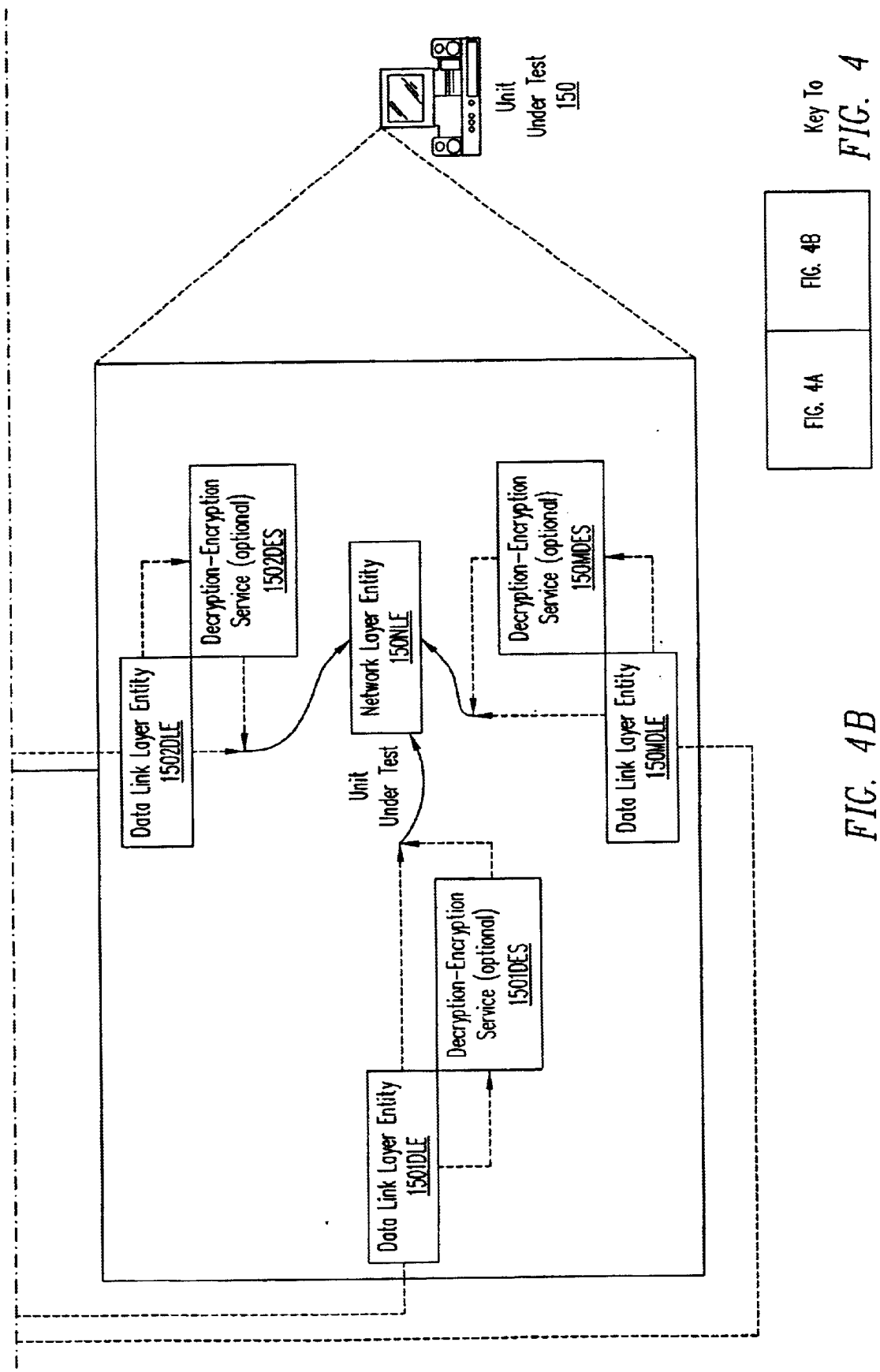

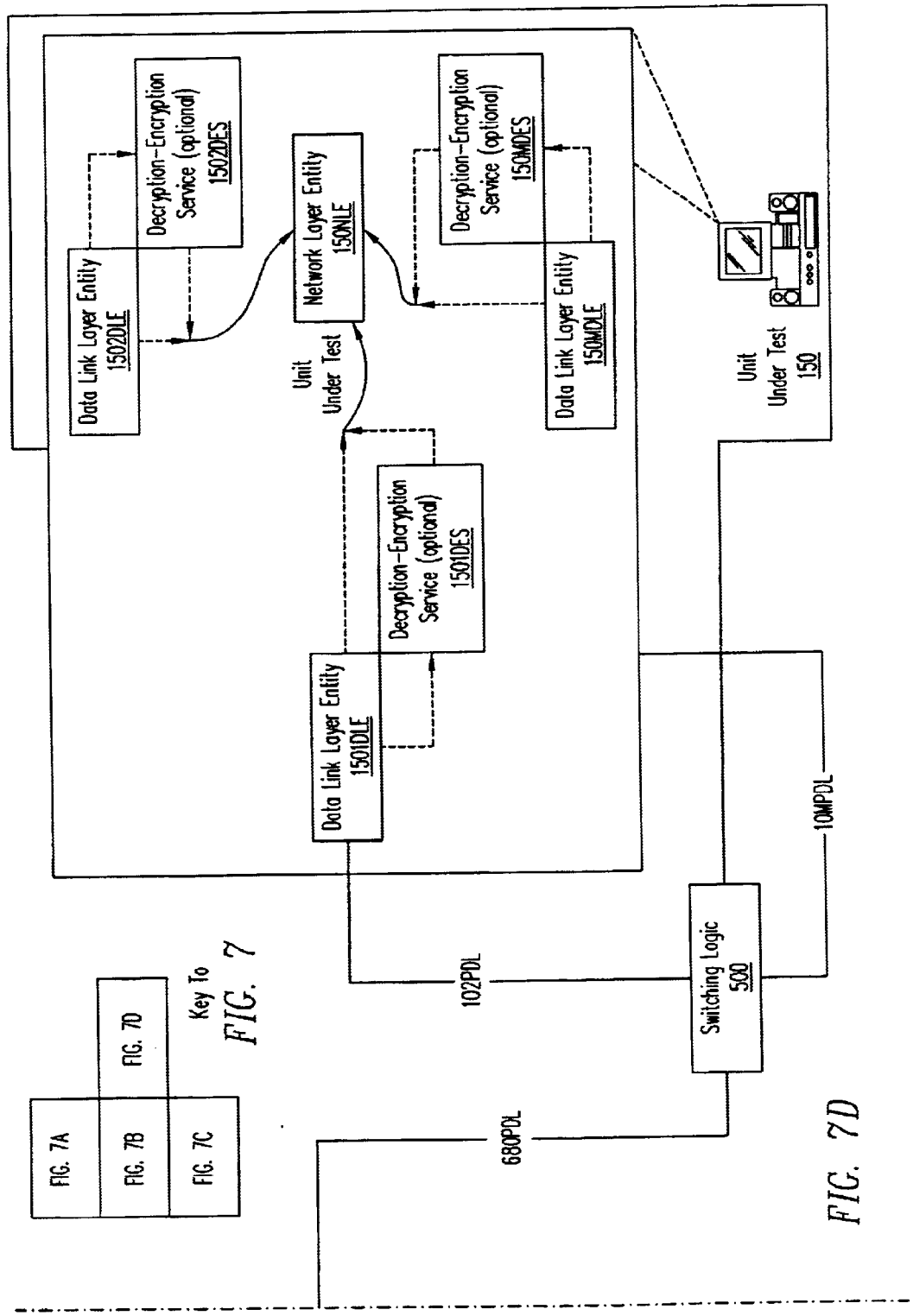

NETWORK COMPONENT PERFORMANCE TESTING

BACKGROUND OF THE INVENTION

1. Field of the Invention

The present invention is related, in general, to data communications networks. In particular, the present invention is related to performance testing of data communications network components.

2. Description of the Related Art

A data communications network is the interconnection of two or more communicating entities by one or more links over which data can be transmitted. The communicating entities and data links in data communications networks can be physical components (e.g., two tangible computer systems connected by tangible physical cables), or logical components overlaid onto physical components (e.g., application programs running on two different tangible computer systems communicating with each other over a time division multiplexed channel). Context is generally used to indicate whether physical or logical components are of interest in any particular discussion.

Performance testing of data communications network components is concerned with gathering data related to how the data communications network components perform under various use conditions. The ideal method of performance testing is to deploy data communications network components in the actual environment (e.g., an active commercial data communications network) in which the components are to be used, and thereafter to test such deployed components.

Unfortunately, it generally not practicable to test data communications network components in their actual environments of use, for a variety reasons. One reason that performance testing of data communications network components in their actual environments of use is not practicable is that the owners of such environments (e.g., the owners of networks forming part of the Internet) are generally not willing to give up part of their network capacity for testing. That is, insofar as performance testing requires control (i.e., the ability to vary) and reproducibility of testing conditions in order to adequately test data communications network components, at least a part of the actual network must be "closed off" to allow the testers to set up and vary testing parameters. Insofar as most data communications networks generally operate at near capacity, most network owners will not or cannot allow a portion of their networks to be closed for testing. Accordingly, for at least the foregoing reasons it is generally not practicable to performance test data communications network components in their actual environments of use.

Barring use of the actual environment wherein data communications network components are to be deployed, conventionally it is believed that the next best testing method involves purchasing the hardware/software expected to be used in the actual network, and thereafter testing the data communications network components with such purchased hardware/software. Unfortunately, since the physical components (each of which corresponds to a physical machine and/or data link) might range into the thousands, such a method is not generally practicable due to the cost and/or space associated with such actual physical components. In addition, insofar as communications programs will generally be utilized with each physical machine, the time involved in loading such programs also makes such testing methods impracticable (e.g., 5 minutes per loading for 1000 machines would be 5000 minutes or roughly 83.3 hours—or 2 work weeks of 40 hours—just to load the programs). In addition to the foregoing, a further impracticability arises from the fact that any time a major test parameter is adjusted, the foregoing processes of program loading must often be reduplicated in that the machines must generally be reconfigured, which again takes a great amount of time. Thus, in those situations where data communications network components to be performance tested are expected to be deployed into networks having a relatively large number of physical and logical connections, testing methods involving purchasing the hardware/software expected to be used in the actual network are generally not practicable.

In light of the foregoing, it is apparent that a need exists in the art for a method and system which provide for the practicable performance testing of data communications network components expected to be deployed in environments having a relatively large number of physical and/or logical data network communication components.

SUMMARY OF THE INVENTION

The inventor named herein has devised method and system which provide for the practicable performance testing of data communications network components expected to be deployed in environment having a relatively large number of physical and/or logical data network communication components. In one embodiment, the method includes but is not limited to coupling one or more modified frame relay sub-interface entities internal to at least one network router with one or more corresponding data link layer entities internal to at least one unit under test. In one embodiment, hardware and software are utilized to effect the foregoing described method. In one embodiment, a system includes but is not limited to one or more modified frame relay sub-interface entities internal to at least one network router coupled with one or more corresponding data link layer entities internal to at least one unit under test. In one embodiment, hardware and software are utilized to effect the foregoing described system.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of this patent application will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1B:
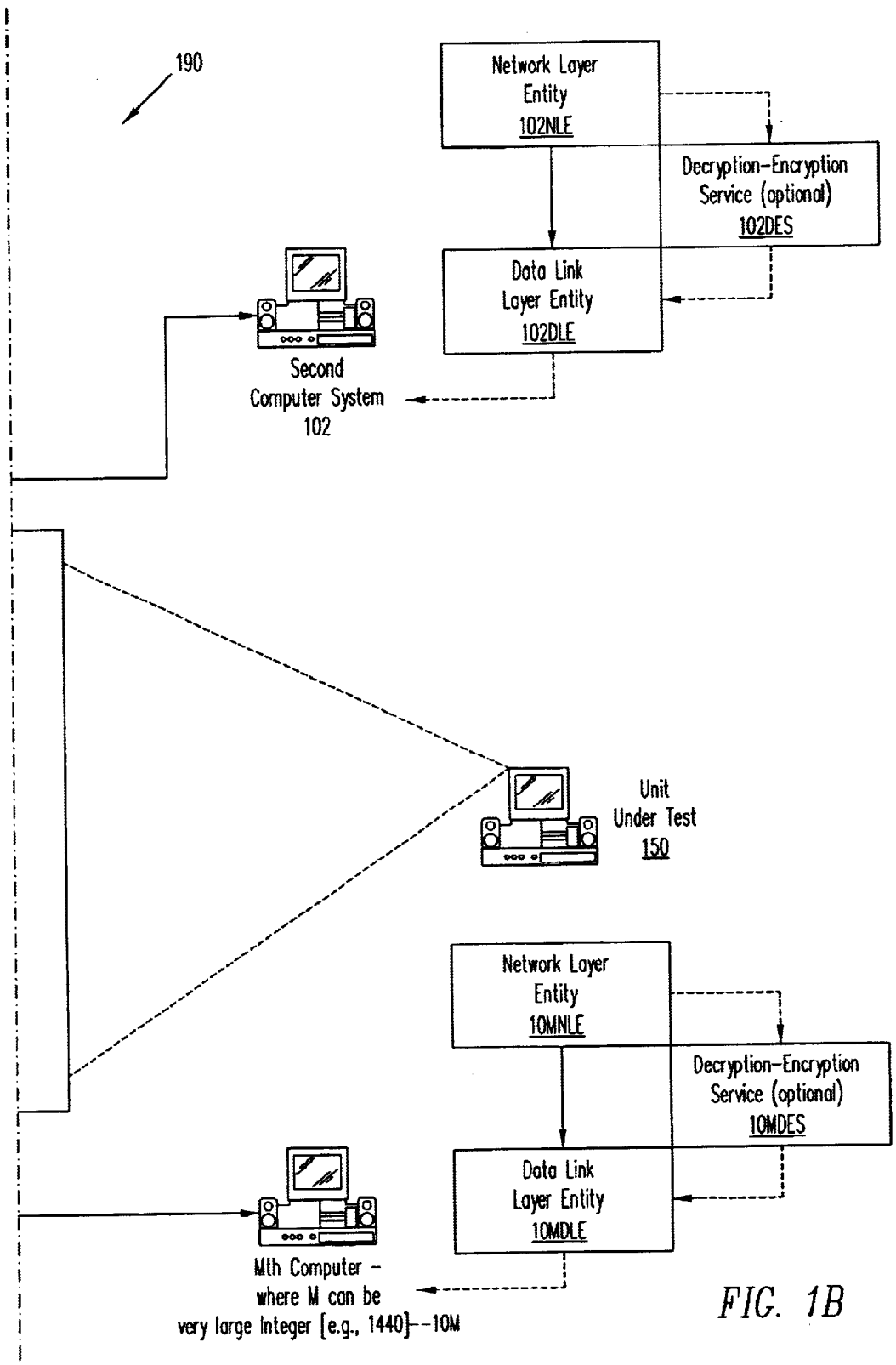
FIG. 1 depicts data communications network 190 which represents an exemplary environment in which a data communications network component would ideally be performance tested if such were practicable.

With reference to the Figures, and in particular with reference now to FIG. 1, depicted is data communications network 190 which represents an exemplary environment in which a data communications network component would ideally be performance tested if such were practicable. Shown is unit under test 150 (depicted as a computer system resident within data communications network 190), which is the network node to be tested. Shown is that unit under test 150 is physically connected with computer systems 101, 102, ..., and 10M (where M is some positive integer greater than 2, and which is meant to show series progression from 101 to 10M (e.g., 101, 102, 103, 104, 105, where M is 5); in practice M is generally in the 1,000s range) via physical data links 101PDL, 102PDL, and 10MPDL (where "PDL" in the reference numerals stands for physical data link; in addition, as used herein, the term "physical data link" is also meant to include non-tangible physical data links, including but not limited to electromagnetic transmission data links (e.g., radio, microwave, and infrared transmission data links)).

Data transmitted over physical data links between computer systems has a tendency to become corrupted. It is customary to employ logical entities, which are known in the art as "data link layer entities," on either side of a physical data link where such data link layer entities ensure that data received over the data link is substantially uncorrupted. Accordingly, depicted is that each physical data link 101PDL, 102PDL, and 10MPDL has an associated pair of data link layer entities which ensure that the data transmitted and received over each physical data link is essentially reliable. That is, data link layer entity 101DLE, resident within computer system 101, works with data link layer entity 1501DLE, resident within unit under test 150, to ensure that data transmitted and received over data link 101PDL is substantially error free; data link layer entity 102DLE, resident within computer system 102, works with data link layer entity 1502DLE, resident within unit under test 150, to ensure that data transmitted and received over data link 102PDL is substantially error free; and data link layer entity 10MDLE, resident within computer system 10M, works with data link layer entity 150MDLE, resident within unit under test 150, to ensure that data transmitted and received over data link 10MPDL is substantially error free.

Delivery of data to appropriate computers within data communications network 190 is handled by network layer entities which handle network addressing and routing decisions. Accordingly, shown is that computer systems 101, 102, ..., 10M, and unit under test 150, respectively have resident network layer entities 101NLE, 102NLE, ..., 10MNLE, and 150NLE. As shown in FIG. 1, typically network layer entities receive data from their respectively associated data link layer entities.

It is becoming more and more common within the art for users to want data encrypted for security reasons. Because encryption adds redundant bits, one of the most common ways such encryption is done is to encrypt and/or decrypt the messages as closely as possible to the data link layer entities (which means that the redundant bits need be carried only through the data link layer). Accordingly, illustrated in FIG. 1 is that each data link layer entity forming a pair spanning a data link has respectively associated with it a companion decryption-encryption service. For example, each of paired decryption-encryption services 101DES and 1501DES is shown respectively associated with each of paired data link layer entities 101DLE and 1501DLE; each of paired decryption-encryption services 102DES and 1502DES is shown respectively associated with each of paired data link layer entities 102DLE and 1502DLE; and each of paired decryption-encryption services 10MDES and 150MDES is shown respectively associated with each of paired data link layer entities 10MDLE and 150MDLE.

As noted above, for various reasons it is impracticable for testing labs to buy upwards of 1000 computer systems, physical data links, and associated software, in order to test unit under test 150. Accordingly, even though the physical environment will be substantially as depicted in FIG. 1, in the related art what has been done in the past is to buy some smaller number of computer systems (e.g., M=10) and then deploy the system to the field, hoping that the testing results "scale" in accord with engineering calculations drawn on the small actual testing setup.

Unfortunately, those skilled in the art will recognize that such scaling does not actually tend to occur. In actuality, it is not uncommon for the actual performance of the unit under test to be grossly off from the predicted scaling. It is therefore apparent that a need exists for a method and system which will allow the testing of unit under test 150 in such a fashion that the actual operation conditions of unit under test 150 are approached, but without the necessity of purchasing the upwards of a 1000, physical data links, and associated software, to stress the unit under test 150.

Figure 2:
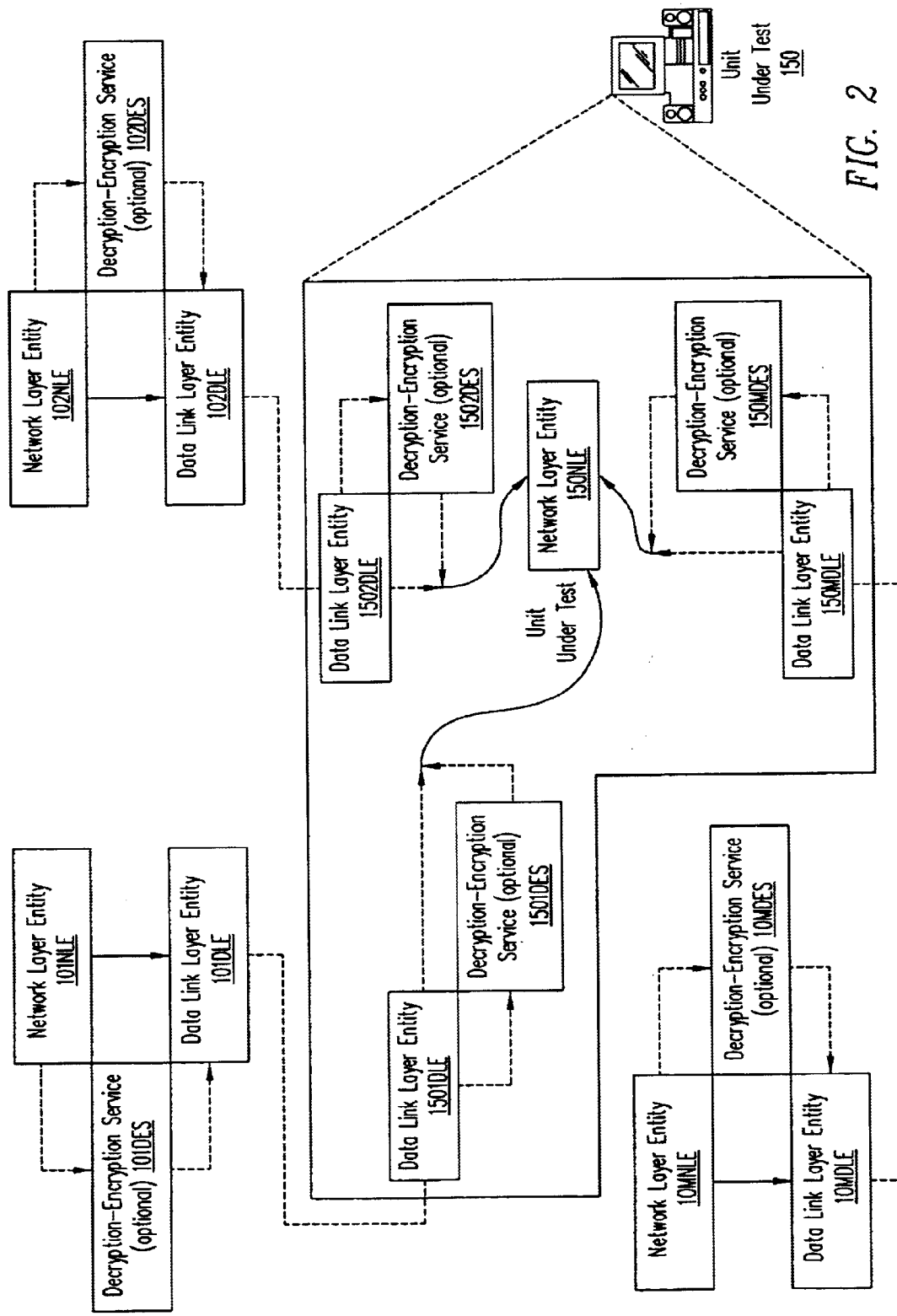
FIG. 2 illustrates that from a viewpoint internal to unit under test 150, the logical components and connections generated by computer systems 101–10M and physical data links 101PDL–10MPDL of FIG. 1 do not necessarily have to be associated with computer systems 101–10M and physical data links 101PDL–10MPDL of FIG. 1.

Referring now to FIG. 2, shown is that the inventor has discovered that, when viewed from a viewpoint internal to unit under test 150, the logical components and connections generated by computer systems 101–10M and physical data links 101PDL–10MPDL of FIG. 1 do not necessarily have to be associated with computer systems 101–10M and physical data links 101PDL–10MPDL. That is, shown in FIG. 2 is a way in which logical components internal to unit under test 150 "see" the logical components and connections generated by computer systems 101–10M and physical data links 101PDL–10MPDL. Notice that logical components and connections generated by computer systems 101–10M and physical data links 101PDL–10MPDL, when observed from a viewpoint internal to unit under test 150, need not really be associated in any way with computer systems 101–10M and physical data links 101PDL–10MPDL which are actually involved in generating such connections.

Figure 3:
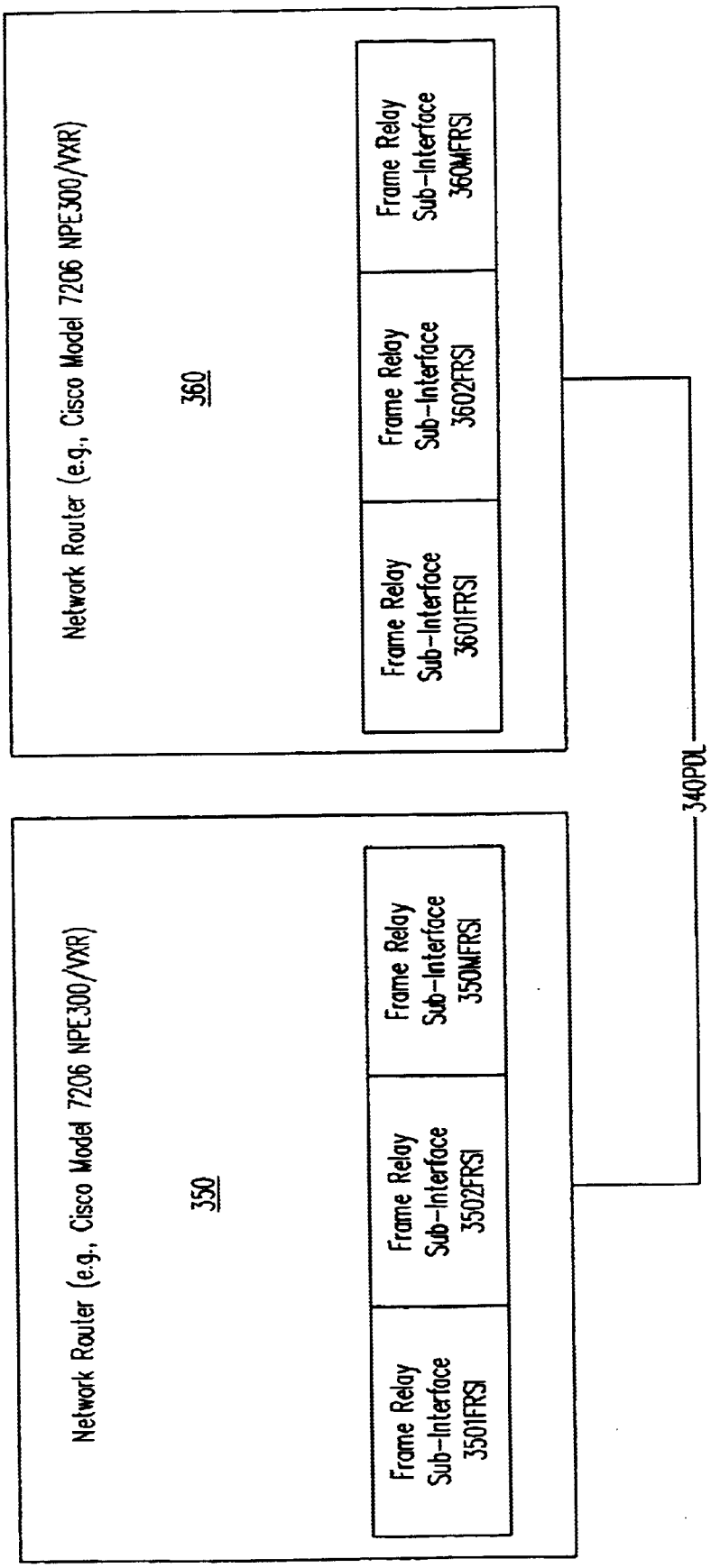
FIG. 3 depicts that network router 350 and network router 360 in communication over physical data link 340PDL.

With reference now to FIG. 3, shown are network router 350 and network router 360. Depicted are that network router 350 and network router 360 are in communication over physical data link 340PDL. Illustrated are that network router 350 and network router 360 simultaneously maintain several logical connections between frame relay sub-interface entities 3501FRSI–350MFRSI and 3601FRSI–360MFRSI, respectively.

Shown in FIG. 3 for sake of illustration is that in one embodiment network routers 350 and 360 are implemented via Cisco Systems Model 7206 NPE300/VXR. However, it is to be understood that network routers 350 and 360 can be implemented utilizing any suitable network routers.

Those skilled in the art will recognize that network routers, such as those depicted in FIG. 3, are among the highest bandwidth communication system devices available. The inventor has discovered that, with only a relatively small amount of manipulation well within the skill of one having ordinary skill in the art, the frame relay sub-interface entities can be modified such that they can work with the data link layer entities depicted in FIG. 2. The inventor has discovered that this fact, along with his realization that such network routers are several magnitudes faster typical devices to be deployed in networks, will allow unit under test 150 to be tested in a fashion closely analogous to real world conditions under which unit under test 150 is likely to be deployed.

Figure 4A:
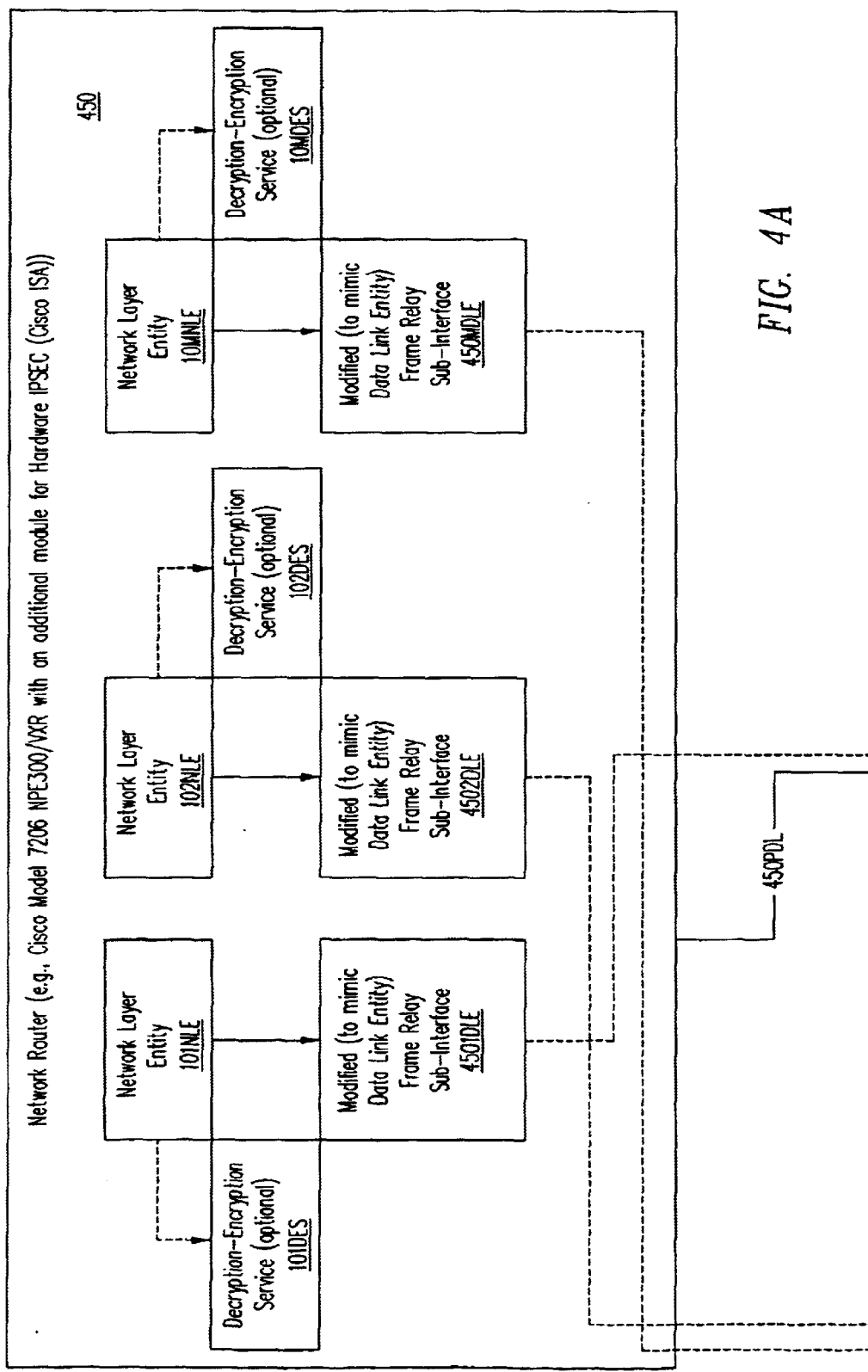
FIG. 4 depicts unit under test 150 having its associated logical components as were described in relation to FIGS. 1–2 in communication with modified frame relay sub-interface components of a network router.

Referring now to FIG. 4, shown is unit under test 150 having associated logical components described and discussed in relation to FIGS. 1–2. Depicted is that each data link layer entity 1502DLE–150MDLE respectively connects with modified frame relay sub-interface entities 4501DLE–450MDLE of network router 460 via physical data link 4501PDL. Modified frame relay sub-interface entities 4501DLE–450MDLE are based on standard frame relay sub-interface entities such as frame relay sub-interface entities 3501DLE–350MDLE of network router 360 of FIG. 3, which have been adjusted such that the modified frame relay sub-interface entities respond and function as if they were data link layer entities 101DLE–10MDLE shown in FIG. 2.

Assuming that network router 450 supports an aggregate of roughly M times that of unit under test 150, shown is that network router 450 can be used to stress unit under test 150 "as if" unit under test 150 were connected to M computer systems 101–10M as shown and described in relation to FIG. 1. Thus the scheme of FIG. 4 allows near-real-world testing of unit under test 150 in a fashion that is much less hardware intensive than the testing scenario depicted and described in relation to FIG. 1.

Shown in FIG. 4 for sake of illustration is that in one embodiment network router 450 is implemented via Cisco Systems Model 7206 NPE300/VXR with an additional module for hardware IPSEC (IP Security). However, it is to be understood that network routers 450 can be implemented utilizing any suitable network router and any suitable IP security module in hardware or software.

Notice that the scheme of FIG. 4 utilizes only one physical data link 450PDL to feed into unit under test 150. It has been discovered by the inventor that the scheme of FIG. 4 can be enhanced to give even more realistic testing scenarios.

Figure 5A:
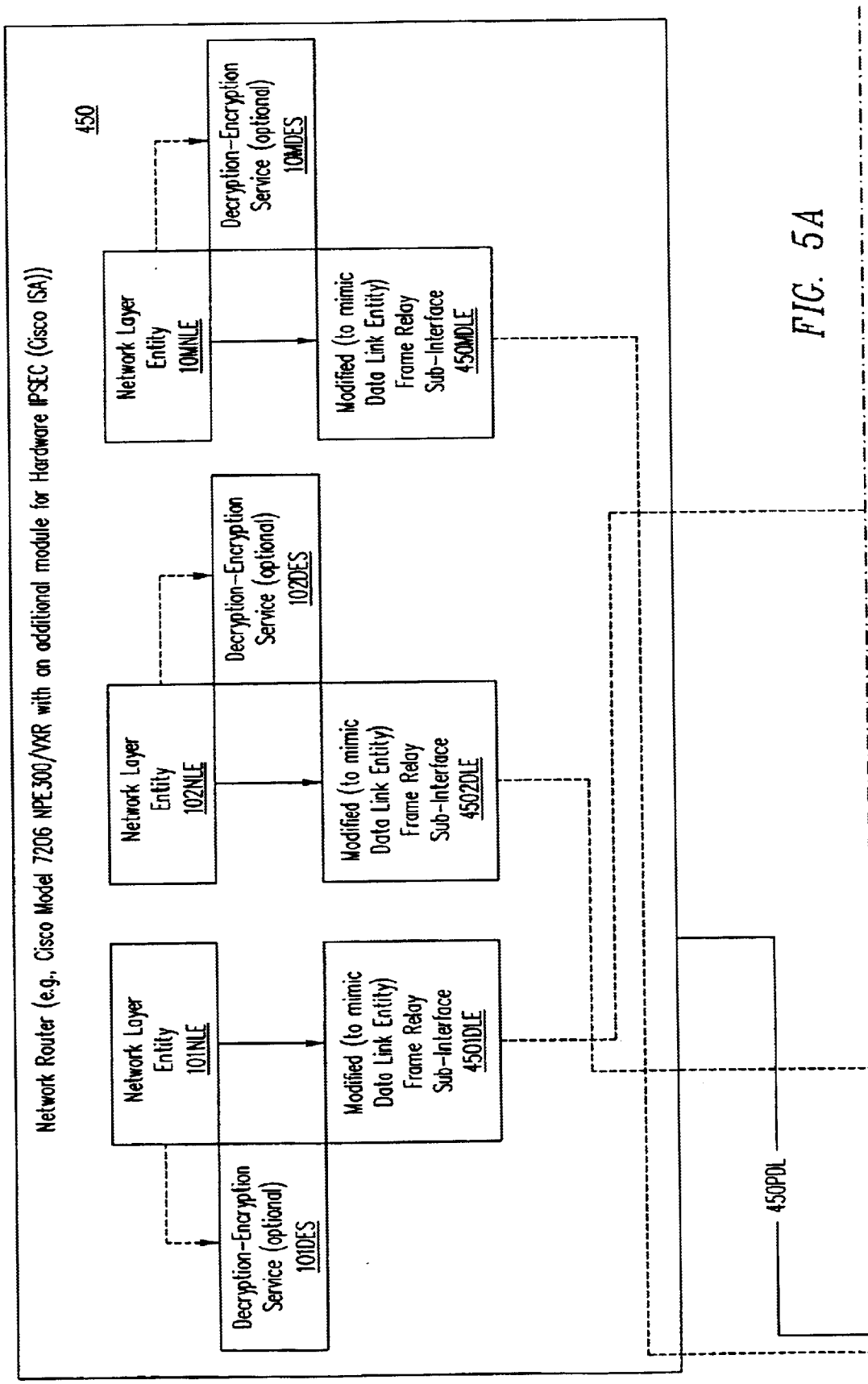
FIG. 5 shows the scheme of FIG. 4 modified such that switching logic 500 is used to "break out" the logical channels respectively associated with data link layer entity 1502DLE–150MDLE and place such logical channels on physical data links 101PDL–10MPDL, which allows testing of unit under test 150 using actual physical data links such as are likely to be encountered in the field.
Figure 5B:
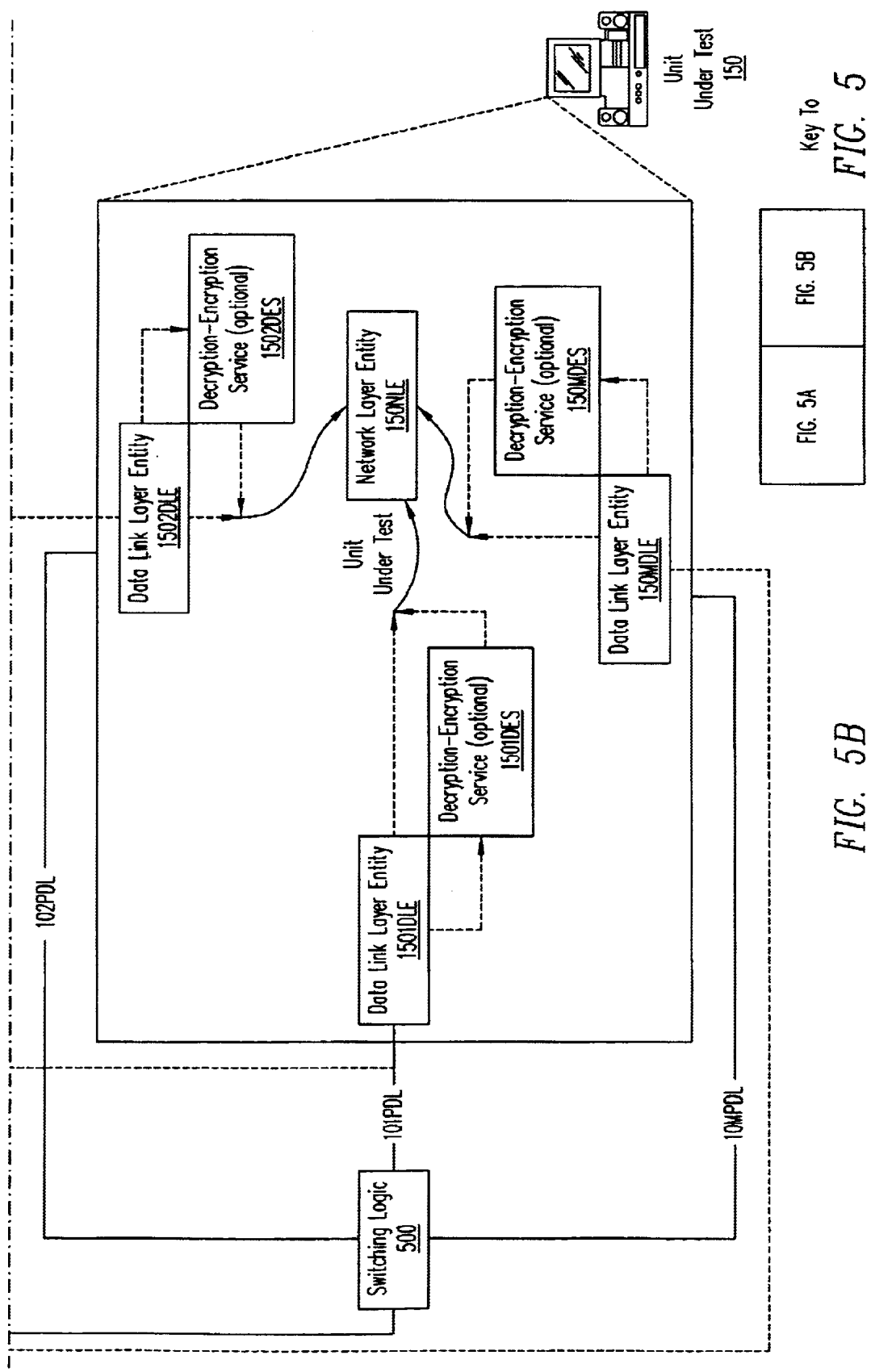
Figure 6A:
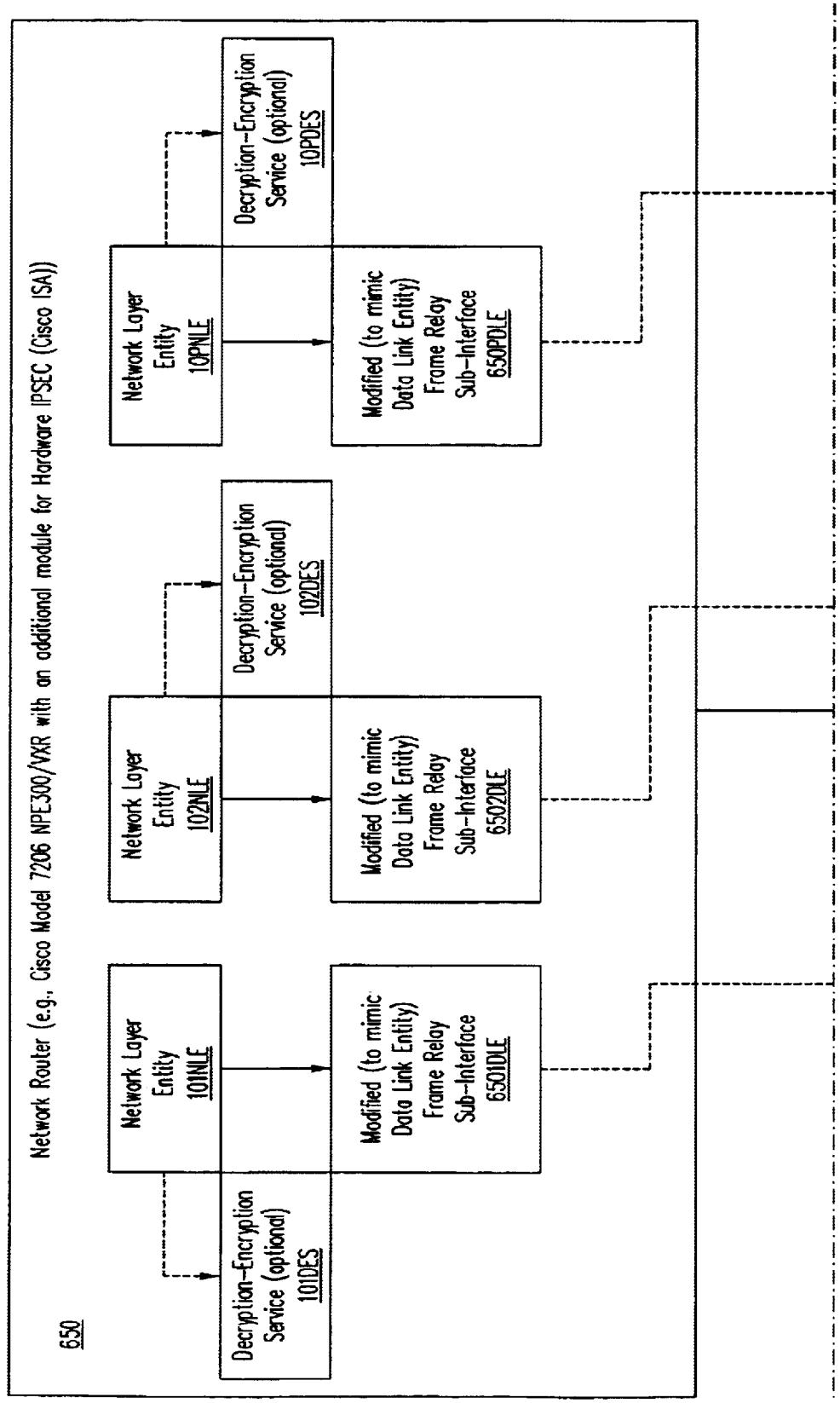
FIG. 6 depicts aggregation unit 600, which in one embodiment is implemented via a Cisco Systems Model 7513 RSP4 VIP-2-50 switch, which receives as input data link layer entity packets produced by network router 650 and 660.
Figure 6B:
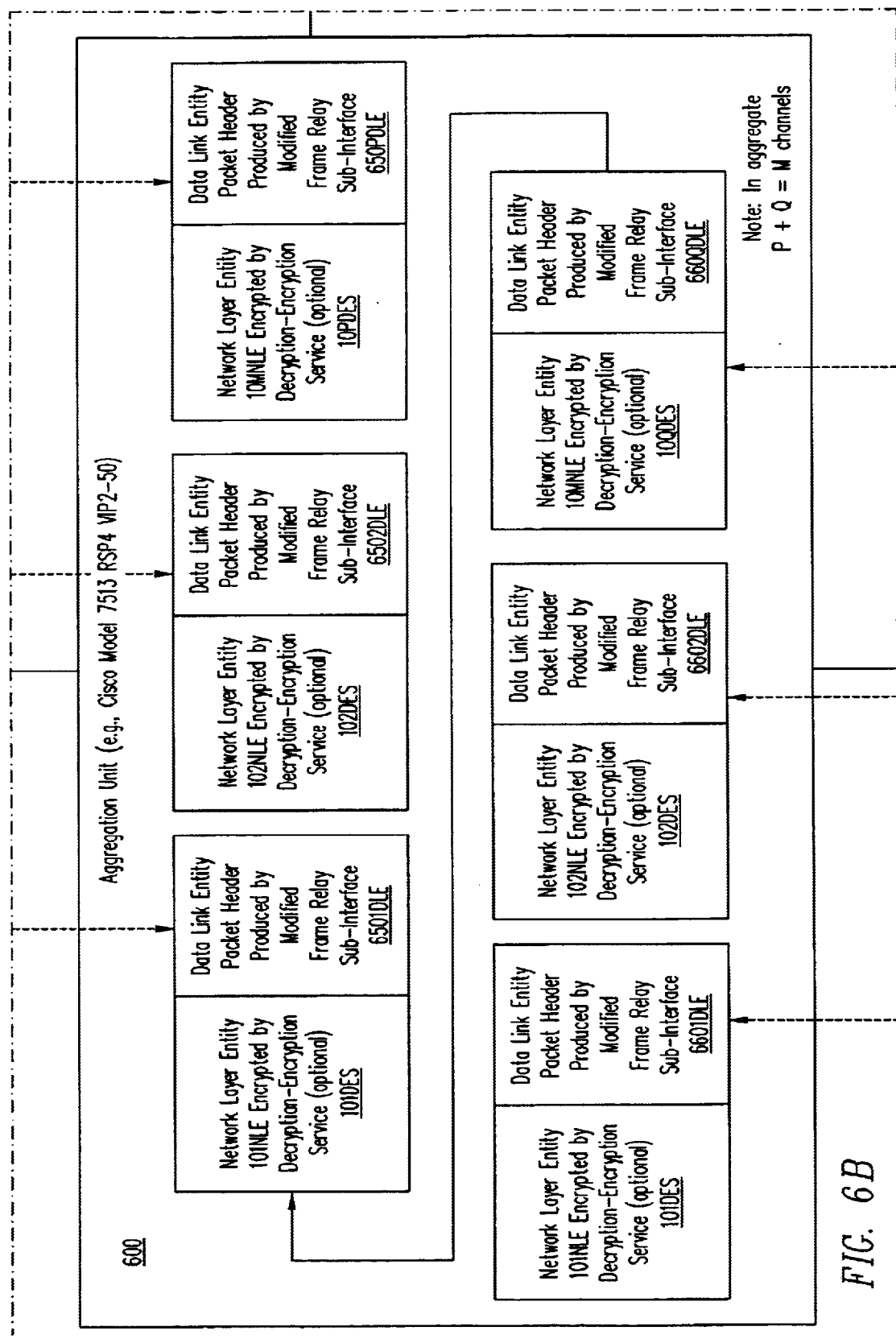
Figure 6C:
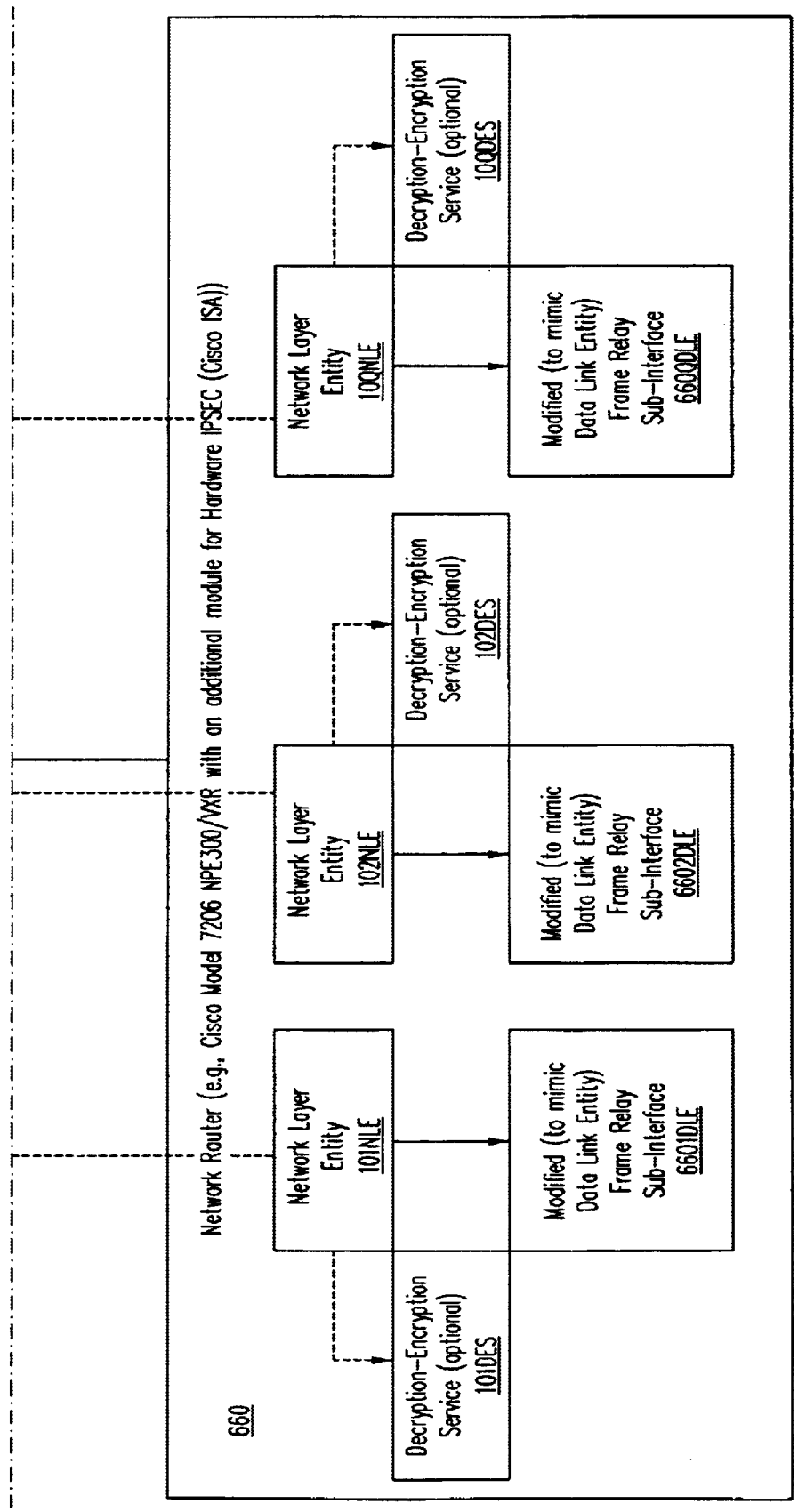
Figure 6D:
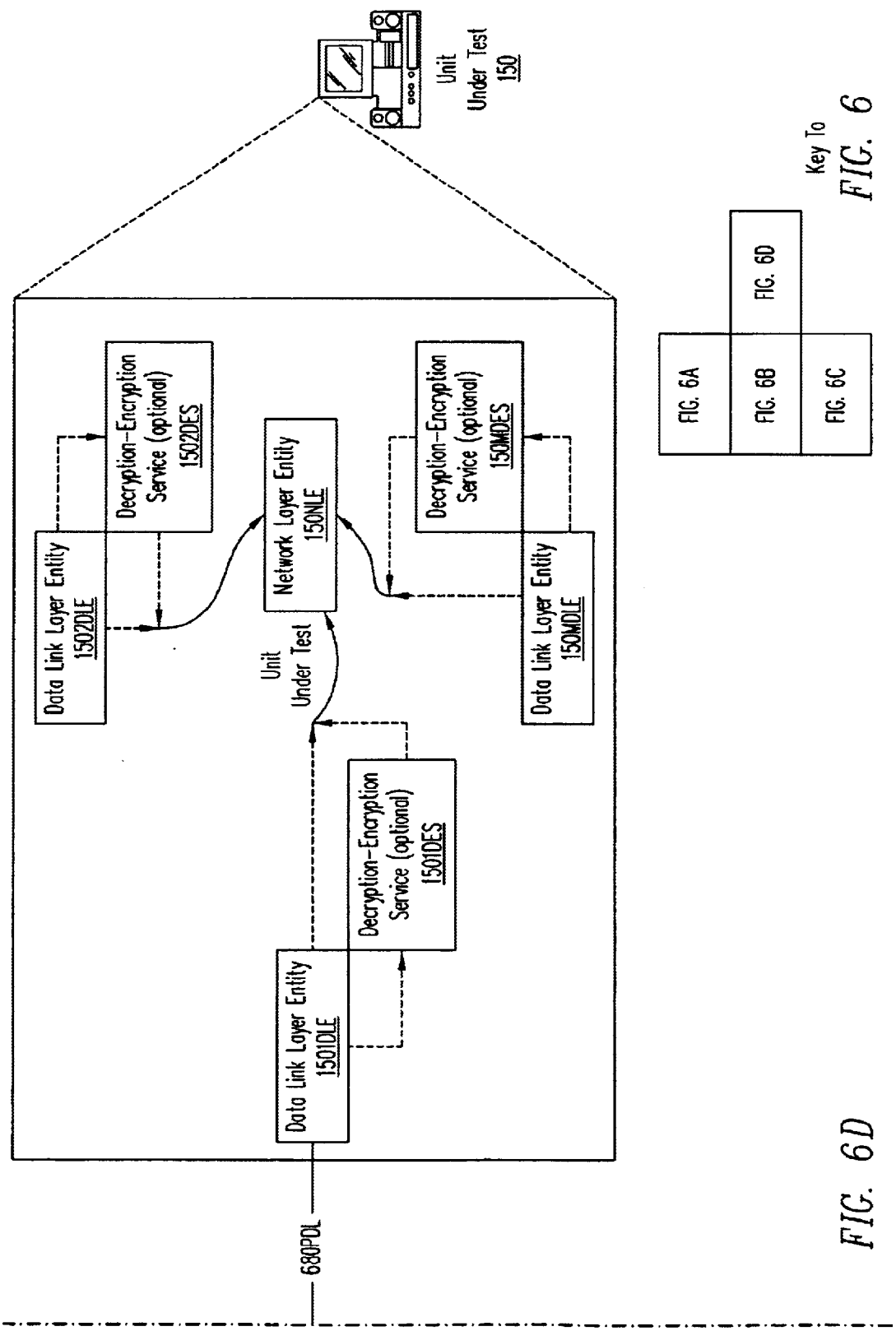

With reference now to FIG. 5, shown is the scheme of FIG. 4 modified such that switching logic 500 is used to "break out" the logical channels respectively associated with data link layer entity 1502DLE–150MDLE and place such logical channels on physical data links 101PDL–10MPDL, which allows testing of unit under test 150 using actual physical data links such as are likely to be encountered in the field. Switching logic 500 switches on data link layer headers of data link layer packets produced by modified frame relay sub-interface entities 4501DLE–450MDLE of network router 460, and can be implemented by any suitable switching device.

Insofar as modern network routers such as network router 450 can generally typically support up to 3,000 frame relay sub-interfaces (e.g., a typical implementation would utilize 1,250 frame relay sub-interfaces for each router 450, with the ability to subsequently expand to 3,000 frame relay sub-interfaces), there will be situations in which the schemes depicted in FIGS. 4 and 5 will not provide enough logical channels sufficient to adequately stress unit under test 150. The inventor has discovered that in such situations the number of logical channels can be increased by using an aggregation techniques illustrated in FIGS. 6 and 7.

Referring now to FIG. 6, shown is aggregation unit 600, which in one embodiment is implemented via a Cisco Systems Model 7513 RSP4 VIP-2-50 switch, which receives as input data link layer entity packets produced by network routers 650 and 660. Depicted is that network router 650 has modified (to mimic data link entity) frame relay sub-interface entities 6501DLE–650PDLE(where P is some integer greater than 1 and less than M), which respectively interface with data link layer entities 1501DLE–150PDLE of unit under test 150. Illustrated is that network router 660 has modified (to mimic data link entity) frame relay sub-interface entities 6601DLE–660QDLE (where Q is some integer such that P+Q=M), which respectively interface with data link layer entities 150(P+1)DLE–150MDLE of unit under test 150. That is, in the aggregate the number of logical channels P+Q produced by network routers 650 and 660 add up to the desire M channels necessary to adequately stress unit under test 150. In one implementation each network router 650 and 660 is configured to produce 1,250 logical channels each, which provides, in the aggregate, 2,500 logical channels.

Shown is that aggregation unit 600 accepts data link layer packets from network routers 650 and 660 and sends them over physical data link 680PDL. Notice that the scheme of FIG. 6 can be used to increase the number of data link layer logical channels until unit under test 150 is stressed to the failure point. It is to be understood that even though only two network routers are shown in FIG. 6, the scheme of FIG. 6 can be expanded to add more network routers to the point necessary such that enough logical channels can be produced to stress unit under test 150 to virtually any number of desired logical channels M.

Figure 7A:
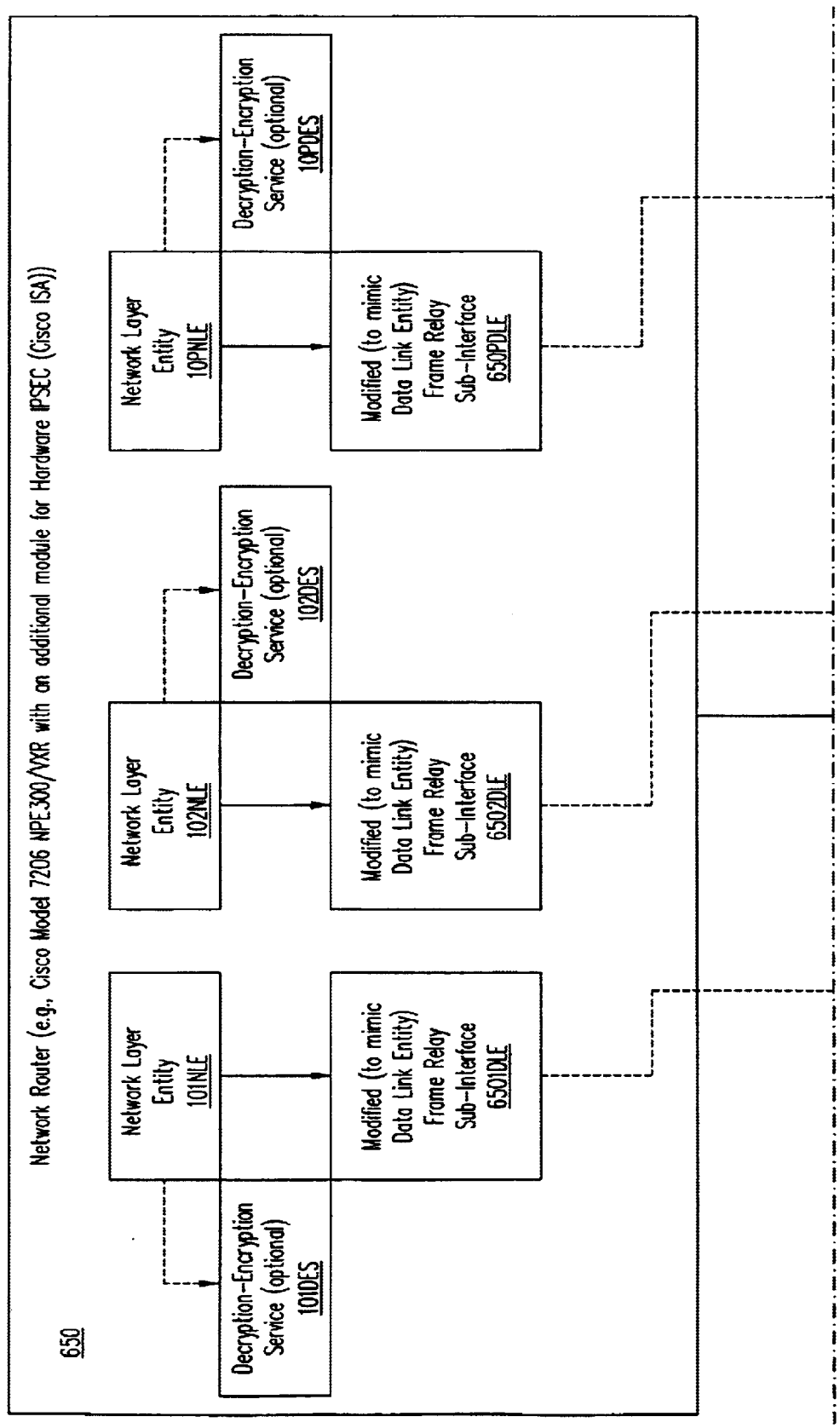
FIG. 7 depicts the scheme of FIG. 6 modified such that switching logic 500 is used to "break out" the logical channels respectively associated with data link layer entity 1502DLE–150MDLE and place such logical channels on physical data links 101PDL–10MPDL, which allows testing of unit under test 150 using actual physical data links such as are likely to be encountered in the field.
Figure 7B:
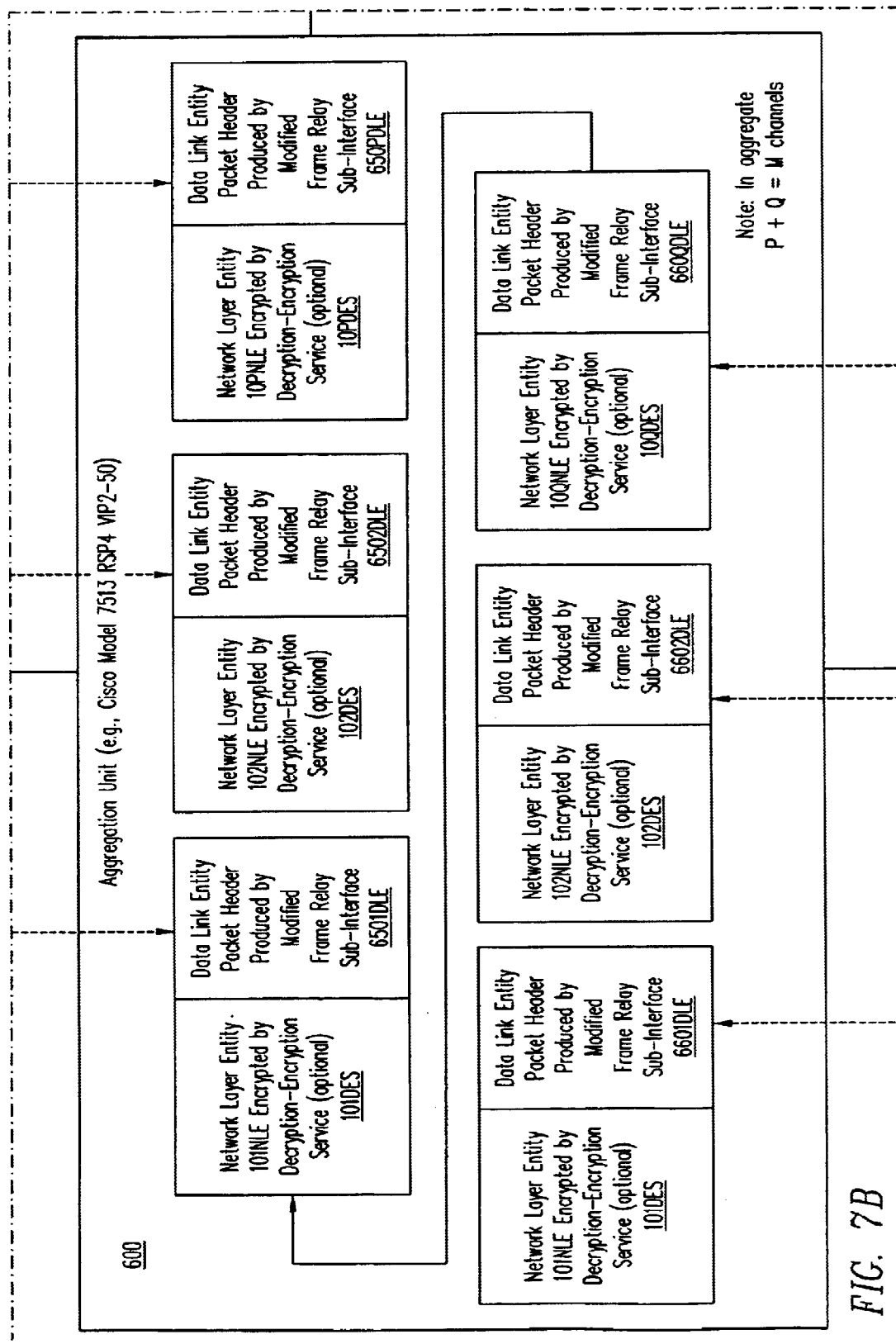
Figure 7C:
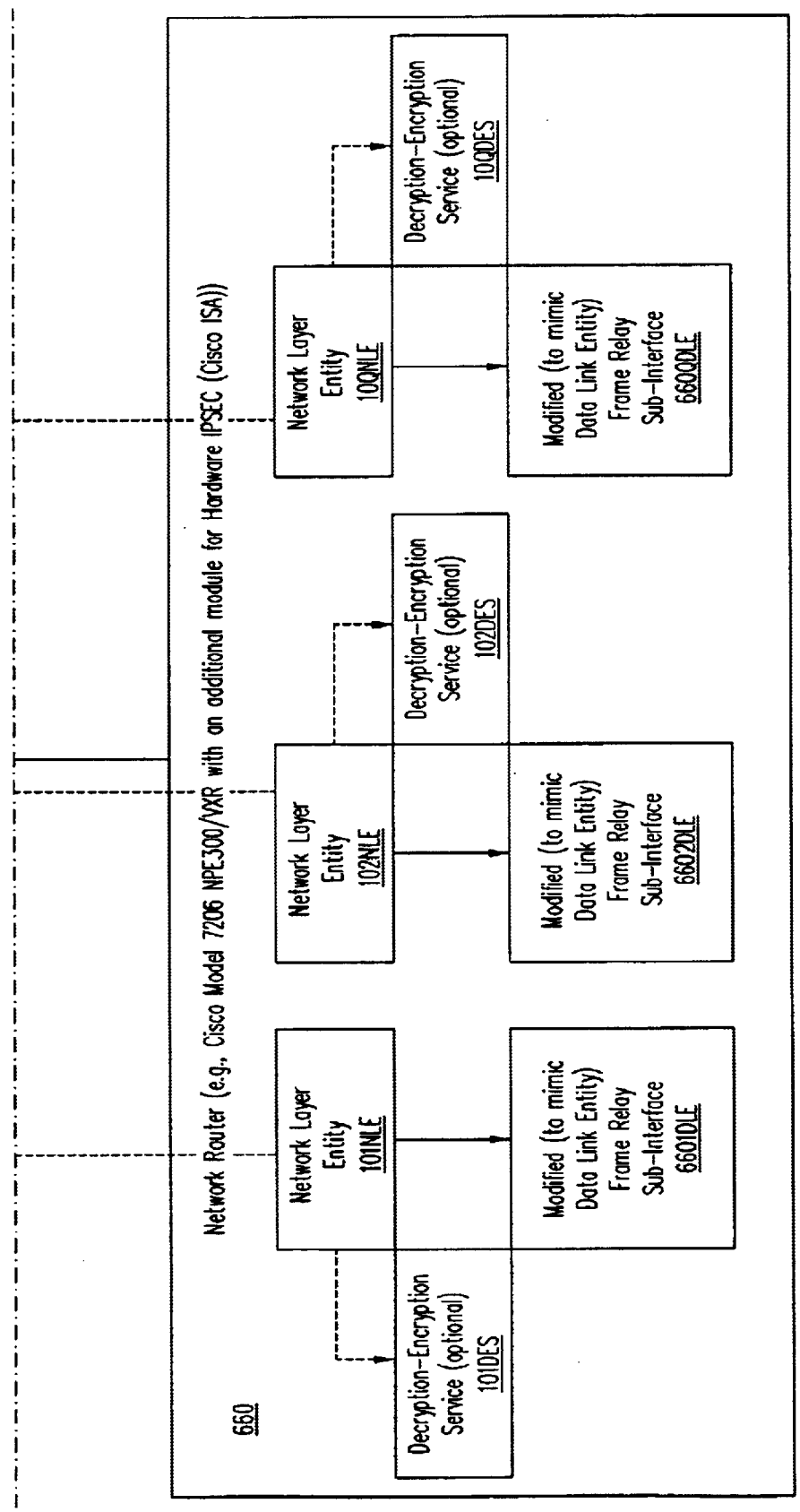

With reference now to FIG. 7, shown is the scheme of FIG. 6 modified such that switching logic 500 is used to "break out" the logical channels respectively associated with data link layer entity 1502DLE–150MDLE and place such logical channels on physical data links 101PDL–10MPDL, which is allows testing of unit under test using actual physical data links such as are likely to be encountered in the field. Switching logic 500 switches on data link layer headers of data link layer packets produced by modified frame relay sub-interface entities 4501DLE–450MDLE of network router 460, and can be implemented by any suitable switching device.

The foregoing detailed description has set forth various embodiments of the present invention via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or any combination thereof. In one embodiment, the present invention may be implemented via Application Specific Integrated Circuits (ASICs). However, those skilled in the art will recognize that the embodiments disclosed herein, in whole or in part, can be equivalently implemented in standard Integrated Circuits, as a computer program running on a computer, as firmware, or as virtually any combination thereof and that designing the circuitry and/or writing the code for the software or firmware would be well within the skill of one of ordinary skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include but are not limited to the following: recordable type media such as floppy disks, hard disk drives, CD ROMs, digital tape, and transmission type media such as digital and analogue communication links using TDM or IP based communication links (e.g., packet links).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that if a specific number of an introduced claim element is intended, such an intent will be explicitly recited in the claim, and in the absence of such recitation no such intent is present. For example, as an aid to understanding, the following appended claims may contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use of definite articles used to introduce claim elements. In addition, even if a specific number of an introduced claim element is explicitly recited, those skilled in the art will recognize that such recitation should typically be interpreted to mean at least the recited number (e.g., the bare recitation of "two elements," without other modifiers, typically means at least two elements, or two or more elements).

What is claimed is:

1. A method for testing, said method comprising:
  coupling one or more modified frame relay sub-interface entities with one or more corresponding data link layer entities, wherein
    the one or more modified frame relay sub-interface entities are internal to at least one network router,
    the one or more corresponding data link layer entities are internal to at least one unit under test,
    each of the one or more modified frame relay sub-interface entities is configured to function as a data link layer entity, and
    the at least one router tests the unit under test as if the unit under test was connected to N computer systems.

2. The method of claim 1, wherein
  N modified frame relay sub-interfaces internal to the at least one router are coupled to N corresponding data link layer entities internal to the at least one unit under test.

3. The method of claim 2, wherein the unit under test is a computer system.

4. The method of claim 2, wherein said coupling one or more modified frame relay sub-interface entities internal to at least one network router with one or more corresponding data link layer entities internal to at least one unit under test further includes:
  connecting at least one physical data link between the at least one network router and the at least one unit under test.

5. The method of claim 4, wherein said connecting at least one physical data link between the at least one network router and the at least one unit under test further includes:
  coupling an input of a first data link to a first network router;
  coupling an output of the first data link to an input of switching logic; and
  connecting at least one output of the switching logic to an input of the unit under test.

6. The method of claim 2, wherein said coupling one or more modified frame relay sub-interface entities internal to at least one network router with one or more corresponding data link layer entities internal to at least one unit under test further includes:
  connecting at least one aggregation unit between the at least one network router and the at least one unit under test.

7. The method of claim 6, wherein said connecting at least one aggregation unit between the at least one network router and the at least one unit under test further includes:
  connecting an output of a first network router and an output of a second network router to an input of a first aggregation unit; and
  connecting an output of the first aggregation unit to the unit under test.

8. The method of claim 6, wherein said connecting at least one aggregation unit between the at least one network router and the at least one unit under test further includes:
  coupling an output of an aggregation unit to an input of switching logic; and
  connecting at least one output of the switching logic to an input of the unit under test.

9. The method of claim 2, wherein said coupling one or more modified frame relay sub-interface entities internal to at least one network router with one or more corresponding data link layer entities internal to at least one unit under test further includes:
  coupling at least one of the one or more modified frame relay sub-interface entities with at least one decryption-encryption service.

10. The method of claim 2, wherein said coupling one or more modified frame relay sub-interface entities internal to at least one network router with one or more corresponding data link layer entities internal to at least one unit under test further includes:
  coupling at least one of the one or more modified frame relay sub-interface entities with at least one network layer entity.

11. A system for testing, said system comprising:
  one or more modified frame relay sub-interface entities coupled with one or more corresponding data link layer entities, wherein
    the one or more modified frame relay sub-interface entities are internal to at least one network router,
    the one or more corresponding data link layer entities are internal to at least one unit under test,
    each of the one or more modified frame relay sub-interface entities is configured to function as a data link layer entity, and
    the at least one router tests the unit under test as if the unit under test was connected to N computer systems.

12. The system of claim 11, wherein
  N modified frame relay sub-interfaces internal to the at least one router are coupled to N corresponding data link layer entities internal to the at least one unit under test.

13. The system of claim 12, wherein the unit under test is a computer system.

14. The system of claim 12, wherein said one or more modified frame relay sub-interface entities internal to at least one network router coupled with one or more corresponding data link layer entities internal to at least one unit under test further includes:
  at least one physical data link connecting the at least one network router with the at least one unit under test.

15. The system of claim 14, wherein said at least one physical data link connecting the at least one network router with the at least one unit under test further includes:
  an input of a first data link coupled to a first network router;
  an output of the first data link coupled to an input of switching logic; and
  at least one output of the switching logic coupled to an input of the unit under test.

16. The system of claim 12, wherein said one or more modified frame relay sub-interface entities internal to at least one network router coupled with one or more corresponding data link layer entities internal to at least one unit under test further include:
  at least one aggregation unit connected between the at least one network router and the at least one unit under test.

17. The system of claim 16, wherein said at least one aggregation unit connected between the at least one network router and the at least one unit under test further includes:
  an output of a first network router and an output of a second network router both connected to an input of a first aggregation unit; and
  an output of the first aggregation unit connected to an input of the unit under test.

18. The system of claim 16, wherein said at least one aggregation unit connected between the at least one network router and the at least one unit under test further includes:
  an output of an aggregation unit coupled to an input of switching logic; and
  at least one output of the switching logic coupled to an input of the unit under test.

19. The system of claim 12, wherein said one or more modified frame relay sub-interface entities internal to at least one network router coupled with one or more corresponding data link layer entities internal to at least one unit under test further includes:
  at least one of the one or more modified frame relay sub-interface entities logically coupled with at least one decryption-encryption service.

20. The system of claim 12, wherein said one or more modified frame relay sub-interface entities internal to at least one network router coupled with one or more corresponding data link layer entities internal to at least one unit under test further includes:
  at least one of the one or more modified frame relay sub-interface entities logically coupled with at least one network layer entity.

21. An apparatus for testing, said apparatus comprising:
  means for one or more modified frame relay sub-interface entities coupled with one or more corresponding data link layer entities, wherein
    the one or more modified frame relay sub-interface entities are internal to at least one network router,
    the one or more corresponding data link layer entities are internal to at least one unit under test,
    each of the one or more modified frame relay sub-interface entities is configured to function as a data link layer entity, and
    the at least one router tests the unit under test as if the unit under test was connected to N computer systems.

22. The apparatus of claim 21, wherein
  N modified frame relay sub-interfaces internal to the at least one router are coupled to N corresponding data link layer entities internal to the at least one unit under test.

23. The apparatus of claim 22, wherein the unit under test is a computer system.

24. The apparatus of claim 22, wherein said means for coupling one or more modified frame relay sub-interface entities internal to at least one network router with one or more corresponding data link layer entities internal to at least one unit under test further includes:
  means for connecting at least one physical data link between the at least one network router and the at least one unit under test.

25. The apparatus of claim 24, wherein said means for connecting at least one physical data link between the at least one network router and the at least one unit under test further includes:
  means for coupling an input of a first data link to a first network router;
  means for coupling an output of the first data link to an input of switching logic; and
  means for connecting at least one output of the switching logic to an input of the unit under test.

26. The apparatus of claim 22, wherein said means for coupling one or more modified frame relay sub-interface entities internal to at least one network router with one or more corresponding data link layer entities internal to at least one unit under test further includes:
  means for connecting at least one aggregation unit between the at least one network router and the at least one unit under test.

27. The apparatus of claim 26, wherein said means for connecting at least one aggregation unit between the at least one network router and the at least one unit under test further includes:
  means for connecting an output of a first network router and an output of a second network router to an input of a first aggregation unit; and
  means for connecting an output of the first aggregation unit to the unit under test.

28. The apparatus of claim 26, wherein said means for connecting at least one aggregation unit between the at least one network router and the at least one unit under test further includes:
  means for coupling an output of an aggregation unit to an input of switching logic; and
  means for connecting at least one output of the switching logic to an input of the unit under test.

29. The apparatus of claim 22, wherein said means for coupling one or more modified frame relay sub-interface entities internal to at least one network router with one or more corresponding data link layer entities internal to at least one unit under test further includes:
  means for coupling at least one of the one or more modified frame relay sub-interface entities with at least one decryption-encryption service.

30. The apparatus of claim 22, wherein said means for coupling one or more modified frame relay sub-interface entities internal to at least one network router with one or more corresponding data link layer entities internal to at least one unit under test further includes:
  means for coupling at least one of the one or more modified frame relay sub-interface entities with at least one network layer entity.

31. A method comprising:
  coupling one or more modified frame relay sub-interface entities internal to at least one network router with one or more corresponding data link layer entities internal to at least one unit under test, wherein
    said coupling one or more modified frame relay sub-interface entities internal to at least one network router with one or more corresponding data link layer entities internal to at least one unit under test further includes:
      connecting at least one physical data link between the at least one network router and the at least one unit under test; and
    said connecting at least one physical data link between the at least one network router and the at least one unit under test further includes:
      coupling an input of a first data link to a first network router;
      coupling an output of the first data link to an input of switching logic; and
      connecting at least one output of the switching logic to an input of the unit under test.

32. A method comprising:
  coupling one or more modified frame relay sub-interface entities internal to at least one network router with one or more corresponding data link layer entities internal to at least one unit under test, wherein
    said coupling one or more modified frame relay sub-interface entities internal to at least one network router with one or more corresponding data link layer entities internal to at least one unit under test further includes:
      connecting at least one aggregation unit between the at least one network router and the at least one unit under test, and
    said connecting at least one aggregation unit between the at least one network router and the at least one unit under test further includes:
      connecting an output of a first network router and an output of a second network router to an input of a first aggregation unit; and
      connecting an output of the first aggregation unit to the unit under test.

33. A method comprising:
  coupling one or more modified frame relay sub-interface entities internal to at least one network router with one or more corresponding data link layer entities internal to at least one unit under test, wherein
    said coupling one or more modified frame relay sub-interface entities internal to at least one network router with one or more corresponding data link layer entities internal to at least one unit under test further includes:
      connecting at least one aggregation unit between the at least one network router and the at least one unit under test,
    said connecting at least one aggregation unit between the at least one network router and the at least one unit under test further includes:
      coupling an output of an aggregation unit to an input of switching logic; and
      connecting at least one output of the switching logic to an input of the unit under test.

34. A system comprising:
  one or more modified frame relay sub-interface entities internal to at least one network router coupled with one or more corresponding data link layer entities internal to at least one unit under test, wherein
    said one or more modified frame relay sub-interface entities internal to at least one network router coupled with one or more corresponding data link layer entities internal to at least one unit under test further includes:
      at least one physical data link connecting the at least one network router with the at least one unit under test, and
    said at least one physical data link connecting the at least one network router with the at least one unit under test further includes:
      an input of a first data link coupled to a first network router;
      an output of the first data link coupled to an input of switching logic; and
      at least one output of the switching logic coupled to an input of the unit under test.

35. A system comprising:
  one or more modified frame relay sub-interface entities internal to at least one network router coupled with one or more corresponding data link layer entities internal to at least one unit under test, wherein
    said one or more modified frame relay sub-interface entities internal to at least one network router coupled with one or more corresponding data link layer entities internal to at least one unit under test further include:
      at least one aggregation unit connected between the at least one network router and the at least one unit under test, and
    said at least one aggregation unit connected between the at least one network router and the at least one unit under test further includes:
      an output of a first network router and an output of a second network router both connected to an input of a first aggregation unit; and an output of the first aggregation unit connected to an input of the unit under test.

36. A system comprising:

one or more modified frame relay sub-interface entities internal to at least one network router coupled with one or more corresponding data link layer entities internal to at least one unit under test, wherein said one or more modified frame relay sub-interface entities internal to at least one network router coupled with one or more corresponding data link layer entities internal to at least one unit under test further include:

at least one aggregation unit connected between the at least one network router and the at least one unit under test, and said at least one aggregation unit connected between the at least one network router and the at least one unit under test further includes:

an output of an aggregation unit coupled to an input of switching logic; and at least one output of the switching logic coupled to an input of the unit under test.

\* \* \* \* \*

UNITED STATES PATENT AND TRADEMARK OFFICE
CERTIFICATE OF CORRECTION

PATENT NO. : 6,895,440 B1
APPLICATION NO. : 09/578942
DATED : May 17, 2005
INVENTOR(S) : William Lui It is certified that error appears in the above-identified patent and that said Letters Patent is hereby corrected as shown below:

At Column 10, line 17, cancel the text beginning with "21. An apparatus for testing" and ending "connected to N computer systems" in column 10, line 32, and insert the following claim:

--21. An apparatus for testing, said apparatus comprising:
one or more modified frame relay sub-interface entities; and
means for coupling the one or more modified frame relay sub-interface entities with one or more corresponding data link layer entitles, wherein
the one or more modified frame relay sub-interface entities are internal to at least one network router,
the one or more corresponding data link layer entities are internal to at least one unit under test, and
each of the one or more modified frame relay sub-interface entities is configured to function as a data link layer entity, and
the at least one router tests the unit under test as If the unit under test was connected to N computer systems.--

Signed and Sealed this

Eighteenth Day of September, 2007

JON W. DUDAS
*Director of the United States Patent and Trademark Office*